US010029357B2

(12) United States Patent
Hofmann

(10) Patent No.: US 10,029,357 B2
(45) Date of Patent: Jul. 24, 2018

(54) PRESS TOOL WITH BISTABLE TENSION MECHANISM

(71) Applicant: Viega Technology GmbH & Co. KG, Attendorn (DE)

(72) Inventor: Frank Hofmann, Attendorn (DE)

(73) Assignee: Viega Technology GmbH & Co. KG, Attendorn (DE)

( * ) Notice: Subject to any disclaimer, the term of this patent is extended or adjusted under 35 U.S.C. 154(b) by 0 days.

(21) Appl. No.: 14/761,648

(22) PCT Filed: Nov. 5, 2014

(86) PCT No.: PCT/EP2014/073811
§ 371 (c)(1),
(2) Date: Jul. 17, 2015

(87) PCT Pub. No.: WO2015/074873
PCT Pub. Date: May 28, 2015

(65) Prior Publication Data

US 2015/0352700 A1 Dec. 10, 2015

(30) Foreign Application Priority Data

Nov. 21, 2013 (DE) ........................ 10 2013 112 848

(51) Int. Cl.
*B23P 19/04* (2006.01)
*B25B 27/10* (2006.01)

(52) U.S. Cl.
CPC ........... *B25B 27/10* (2013.01); *Y10T 29/5367* (2015.01)

(58) Field of Classification Search
CPC .... B25B 7/00; B25B 7/02; B25B 7/06; B25B 7/20; B25B 27/10; B25B 27/02; B25B 25/005; Y10T 29/5367
(Continued)

(56) References Cited

U.S. PATENT DOCUMENTS 2,595,699 A * 5/1952 Petersen .................. B25B 1/22
269/163
2,688,267 A * 9/1954 Schmuldt ........... H05K 13/0007
140/71.5
(Continued)

FOREIGN PATENT DOCUMENTS

CN 1662345 A 8/2005
CN 203030770 U 7/2013
(Continued)

*Primary Examiner* — David Bryant
*Assistant Examiner* — Nirvana Deonauth
(74) *Attorney, Agent, or Firm* — The Webb Law Firm

(57) ABSTRACT

The invention relates to a press tool for connection of a pipe and a fitting, in particular for inseparable connection, with two pivoting elements, with two actuating sections formed on the pivoting elements, with two pressing sections formed on the pivoting elements, with two carrier elements assigned to the pivoting elements, and with a bistable tension mechanism, wherein each of the pivoting elements is mounted so that it can pivot about an assigned axis of rotation, wherein the carrier elements hold the axes of rotation, wherein the inner contours of the opposing pressing sections form a receiving area and wherein the receiving area formed by the inner contours in a first closed position of the pivoting elements is narrower than in a second open position of the pivoting elements.

8 Claims, 4 Drawing Sheets

(58) Field of Classification Search
USPC .............................................................. 81/427
See application file for complete search history.

(56) References Cited

U.S. PATENT DOCUMENTS

| | | | | |
|---|---|---|---|---|
| 6,434,998 | B2 * | 8/2002 | Amherd | 29/237 |
| 6,457,338 | B1 * | 10/2002 | Frenken | B21D 39/04<br>29/708 |
| 7,155,955 | B2 * | 1/2007 | Bowles | B25B 27/10<br>72/407 |
| 7,188,508 | B2 * | 3/2007 | Bowles | B21D 39/046<br>29/237 |
| 8,137,379 | B2 * | 3/2012 | Labash | A61H 39/04<br>269/3 |
| 8,336,362 | B2 * | 12/2012 | Frenken | B21D 39/04<br>72/416 |
| 2003/0230130 | A1 | 12/2003 | Bowles et al. | |
| 2009/0293577 | A1 * | 12/2009 | Hamm | B25B 7/02<br>72/416 |

FOREIGN PATENT DOCUMENTS

| | | | |
|---|---|---|---|
| DE | 3423283 | A1 | 1/1986 |
| DE | 29614804 | U1 | 11/1996 |
| DE | 102007006929 | A1 | 8/2008 |
| DE | 102007061164 | A1 | 6/2009 |
| DE | 102012100357 | A1 | 7/2013 |
| EP | 0860245 | A2 | 8/1998 |
| EP | 2072188 | A1 | 6/2009 |

* cited by examiner

PRESS TOOL WITH BISTABLE TENSION MECHANISM

CROSS-REFERENCE TO RELATED APPLICATIONS

This application is the United States national phase of International Application No. PCT/EP2014/073811 filed Nov. 5, 2014, and claims priority to German Patent Application No. 10 2013 112 848.3 filed Nov. 21, 2013, the disclosures of which are hereby incorporated in their entirety by reference.

BACKGROUND OF THE INVENTION

Field of the Invention

The invention relates to a press tool for the inseparable connection of a pipe and a fitting with two pivoting elements, with two actuating sections formed on the pivoting elements, with two pressing sections formed on the pivoting elements, with two carrier elements supporting the pivoting elements and with a bistable tension mechanism, wherein each of the pivoting elements is mounted so that it can pivot about a corresponding axis of rotation, wherein the carrier elements hold the axes of rotation, wherein the inner contours of the opposing pressing sections form a receiving area and wherein the receiving area formed by the inner contours in a first closed position of the pivoting elements is narrower than in a second open position of the pivoting elements.

Description of Related Art

Pressing tools of the abovementioned kind are known from the prior art. For the tension mechanism, by way of example, a spring is provided between the actuating sections of the pivoting elements, which spreads the actuating sections and thus simultaneously pushes the pressing sections together, so that the receiving area narrows. In this way, the inner contours of the pressing sections, by spring force, are brought into abutment to the outer circumferential surface of the pipe or fitting to be pressed or the sleeve to be pressed, before the cold pressing is performed by a power machine engaging with the actuating sections of the pivoting elements.

If a user wishes to employ such a press tool, he must on the one hand place the components to be pressed in the intended pressing position and maintain them there, and on the other hand push the actuating sections against each other in such a way that stress is applied in the tension mechanism, in order to prepare the press tool for receiving the components, and also bring the press tool and the connected power machine into the envisaged position for pressing and hold it there. Thus, there are three points to which the user must pay attention. In practice, the user can if necessary enlist the help of another person to perform one of the three abovementioned activities. The user can also perform the first of the abovementioned activities by using technical aids, in which he secures the components to be pressed, for example, before the press tool is positioned. However, use of a press tool as mentioned above is made more difficult for the user if he wishes to perform the pressing without the assistance of another person or further technical aids, in particular without separate fixing of the components.

From DE 10 2007 061 164 a press jaw is known whereby the two pivoting elements can be pre-tensioned relative to one another in two opposing positions. For this purpose, a bistable tension mechanism is provided. Starting from the bistable position a leg spring operates ensuring that the receiving area formed by the inner contours of the pressing sections of the pivoting elements in a first closed position of the pivoting elements is narrower than in a second open position of the pivoting elements. Such a design has a number of disadvantages. Firstly, this system places very high demands on the positional accuracy of the individual elements relative to one another and on the precise shape of the leg spring. Secondly, apart from a high degree of wear the effort required for assembly has also proven to be a disadvantage.

SUMMARY OF THE INVENTION

Therefore, the technical problem for the present invention is to provide a press tool which is easier to handle and at the same time has a simpler design and lower susceptibility to wear.

The problem set out above is solved according to the invention by a press tool of the abovementioned generic type, in that between the two pivoting elements a compression spring is arranged and that the compression spring starting from a bistable intermediate position pushes the pivoting elements either into the first position or into the second position.

In this way, the vulnerable and difficult to mount leg spring is replaced by a compression spring. This compression spring is fitted in such a way that the maximum spring force and thus the greatest spring tension results in a bistable tilt or intermediate position. As a result, this state is not maintained by itself. The pivoting elements of the press tool tilt or pivot as a result of the buckling or deflection of the compression spring always into one of two positions, and thus either into the closed position or the open position. The closed or open position is then maintained by the force of the buckled or deflected spring. Only under the effect of an external force that is greater than the spring force can the switching position or the open or closed position be changed.

A design as described above of the press tool is significantly less expensive than a leg spring. In addition, the compression spring is easier to mount and ensures reliable operation coupled with a simpler jaw geometry of the pivoting elements.

Operation of the press tool similarly offers advantages. If the press tool is opened manually, the pivoting elements are maintained in this open position until the open switching position is switched by targeted directed approach of the roll holder of a connected feed tool. The press tool is then closed around the fitting, but the pressing process is not started yet. At this point, the operator can again manually open the press jaw and access the fitting to correct its positioning. Only when the operator is sure that he has correctly positioned the press tool, the pressing process can be started. It is also possible to fully retract the roll holder of the feed tool, in order to again completely release the press tool from the fitting.

In a preferred manner, the bistable intermediate position is set by a linear arrangement of the compression spring along a line between the two axes of rotation. This allows accurate positioning of the compression spring between the axes of rotation, such that a symmetrical design with regard to the two stable positions can be achieved. In any case, the compression spring will leave this linear bistable position with maximum spring force and thus with the greatest spring tension in the direction of one of the two positions with the lowest external force application, if not by itself, in order to prestress the pivoting elements relative to each other selectively in the open or closed position.

Furthermore, the pivoting elements can have a recess to accommodate in each case one end of the compression spring. Here, a symmetrical design of the two recesses can be selected so that the compression spring is symmetrically arranged between the two pivoting elements. The form of the recess is preferably matched to the outer form of the compression spring, so that a precise seating of the compression spring within the recesses results. This reduces the friction between the compression spring and the recesses and thus the susceptibility to wear. Instead of the recess, the pivoting elements can also each have a protruding pin on the end of which one end of the compression spring is arranged.

In a further preferred manner the pivoting elements are joined together by means of corresponding engagement means, in particular in the form of a hinge, so that the pivoting movement of the two pivoting elements is essentially synchronized.

BRIEF DESCRIPTION OF THE DRAWINGS

In the following, the invention is explained in more detail using an embodiment, with reference to the attached drawing. The drawing shows as follows.

DETAILED DESCRIPTION OF THE INVENTION

Figure 1:
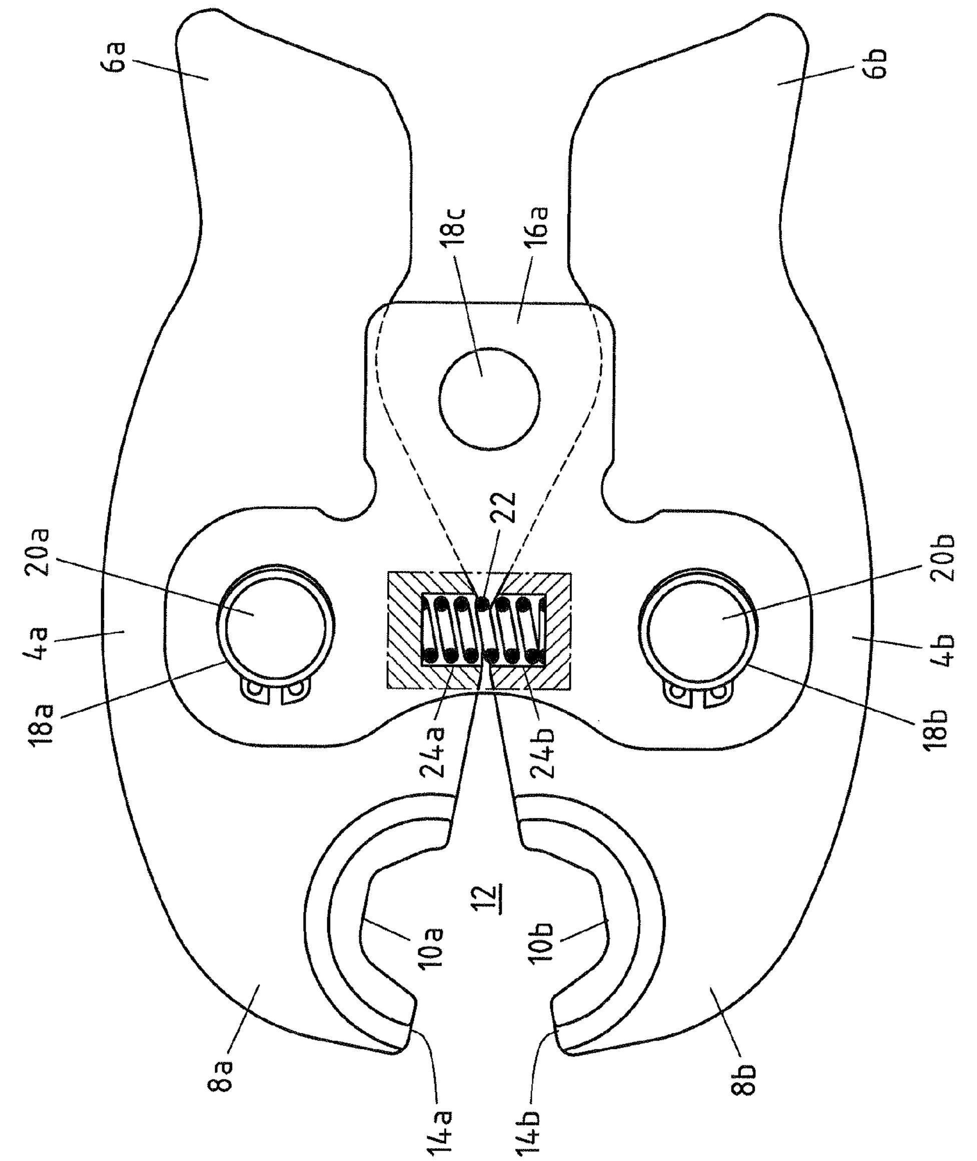
FIG. 1 an embodiment according to the invention of a press tool in a bistable position in side view with a rectangular section in sectional view.

FIG. 1 shows a press tool 2 according to the invention for the inseparable connection of a pipe and a fitting with two pivoting elements 4*a*, 4*b* each with an actuating section 6*a*, 6*b* and a pressing section 8*a*, 8*b*. An area of each of the pressing sections 8*a*, 8*b* has an inner contour 10*a*, 10*b*, so that between the inner contours 10*a*, 10*b* of the opposing pressing sections 8*a*, 8*b* a receiving area 12 is formed. In the representation in FIG. 1 the receiving area 12 is shown half open. In other words, the abutting surfaces 14*a*, 14*b* of the pressing sections 8*a*, 8*b* are spaced apart.

On the outer lateral surfaces of the pivoting elements 4*a*, 4*b* two carrier elements 16*a*, 16*b* are arranged, which in this example have a T-shape and of which in FIG. 1 only the front carrier element 16*a* can be seen. By means of drill holes 18*a*, 18*b* suitably provided on the carrier elements 16*a*, 16*b* and on the pivoting elements 4*a*, 4*b*, the pivoting elements 4*a*, 4*b* are supported by the carrier elements 16*a*, 16*b*, for example by means of a bolt so that they can pivot. In this way each pivoting element 4*a*, 4*b* is assigned an axis of rotation 20*a*, 20*b*. A further drill hole 18*c* on each carrier element 16*a*, 16*b* is provided for connecting the carrier element 16*a*, 16*b* and thus the press tool 2 with a power machine (not shown).

Each of the pivoting elements 4*a*, 4*b* is thus supported by an axis of rotation 20*a*, 20*b* assigned about which it can pivot.

An explanation of the bistable tension mechanism according to the invention is provided in the following. This tension mechanism allows the receiving area 12 formed by the inner contours 10*a*, 10*b* in a first closed position of the pivoting elements 4*a*, 4*b* shown in FIG. 2 to be narrower than in a second open position of the pivoting elements 4*a*, 4*b* shown in FIG. 3. Thus starting from the bistable intermediate position shown in FIG. 1 either the first or the second stable position can be taken.

To this end, between the two pivoting elements 4*a*, 4*b* a compression spring 22 is arranged. As shown in FIG. 1, the bistable intermediate position is set by a linear arrangement of the compression spring 22 along a line between the two axes of rotation 20*a*, 20*b*. In this intermediate position, the compression spring 22 exerts the maximum compressive force on the two pivoting elements 4*a*, 4*b*, which are held in position by the axes of rotation 20*a*, 20*b*. The compression spring 22 has therefore the mechanical effort to avoid this high compressive force and deflect to the right or left in FIG. 1.

Figure 2:
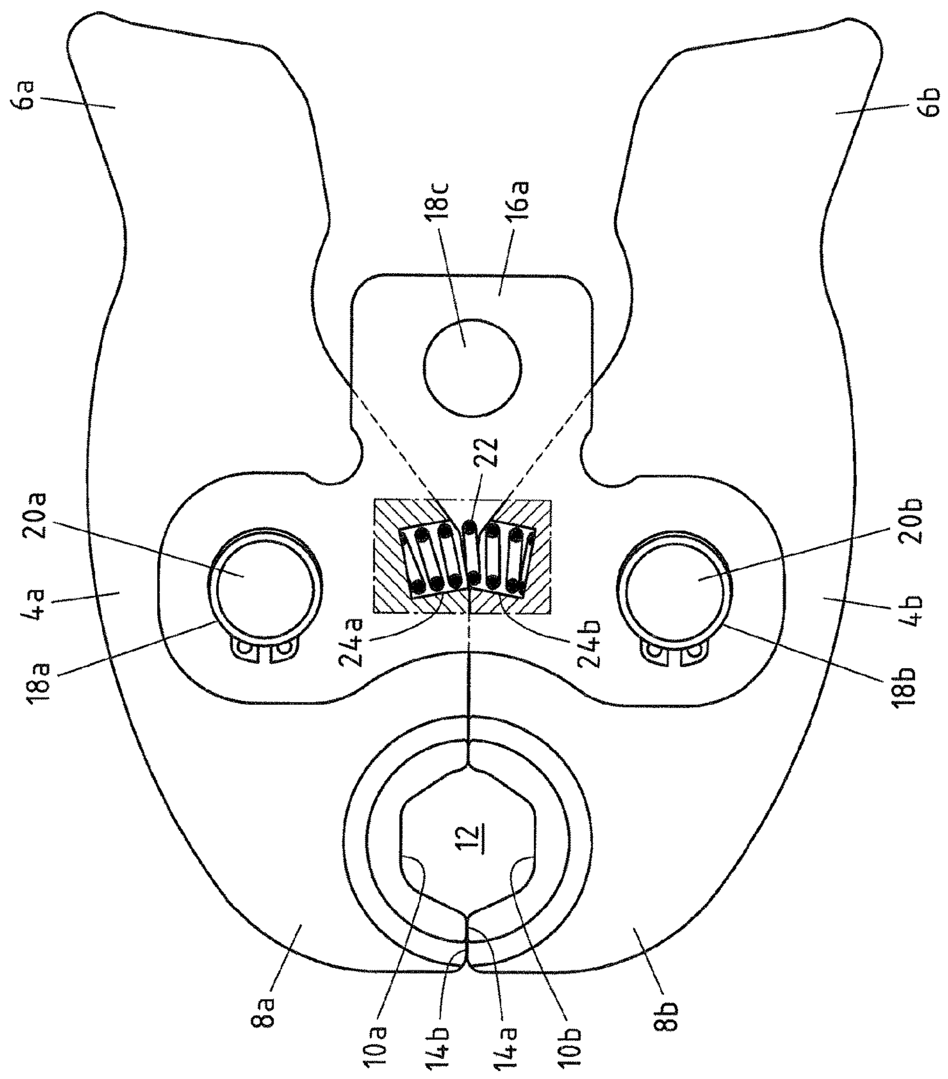
FIG. 2 the press tool shown in FIG. 1 in a closed position in side view with a rectangular section in sectional view.
Figure 3:
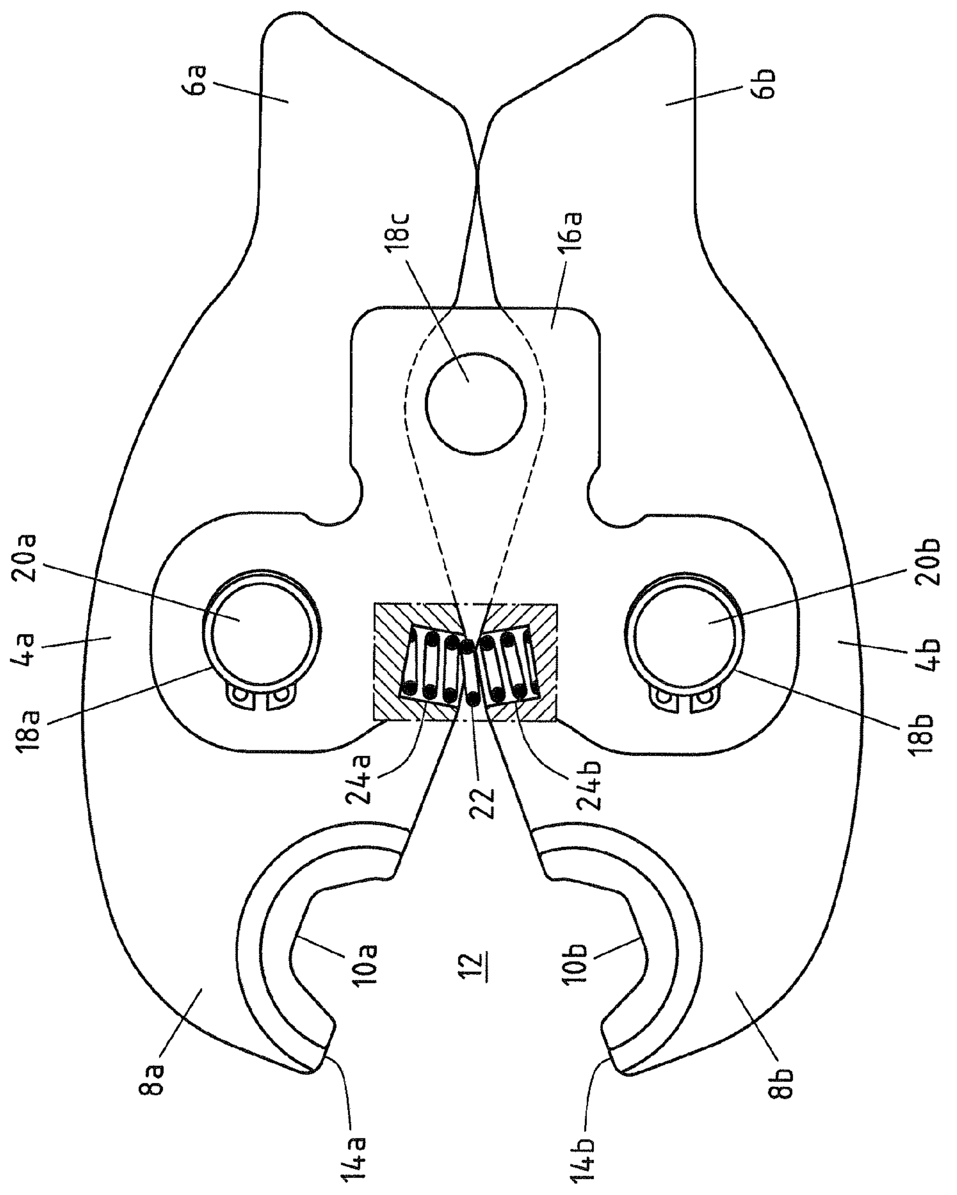
FIG. 3 the press tool shown in FIG. 1 in an opened position in side view with a rectangular section in sectional view.

Thus the compression spring 22, starting from the bistable intermediate position according to FIG. 1, can push the pivoting elements either into the first closed position according to FIG. 2 or into the second open position according to FIG. 3. This results in two stable arrangements of the two pivoting elements 4*a*, 4*b* in relation to each other, which can be used when operating the press tool 2 and simplify operation of the press tool.

Each of the pivoting elements 4*a*, 4*b* also has a recess 24*a*, 24*b* each for accommodating one end of the compression spring 22, as can be seen from the rectangular partial sections of FIGS. 1 to 3 in sectional view. By means of the recesses 24*a*, 24*b* the compression spring 22 is kept stable relative to the two pivoting elements 4*a*, 4*b*, so that reliable functioning of the press tool 2 is ensured. Here, the dimensions of the recesses 24*a*, 24*b* are selected such that the ends of the springs are held without significant play, in order to reduce or even avoid increased wear from the relative movement of the ends of the compression spring 22 in the recesses 24*a*, 24*b*.

Figure 4:
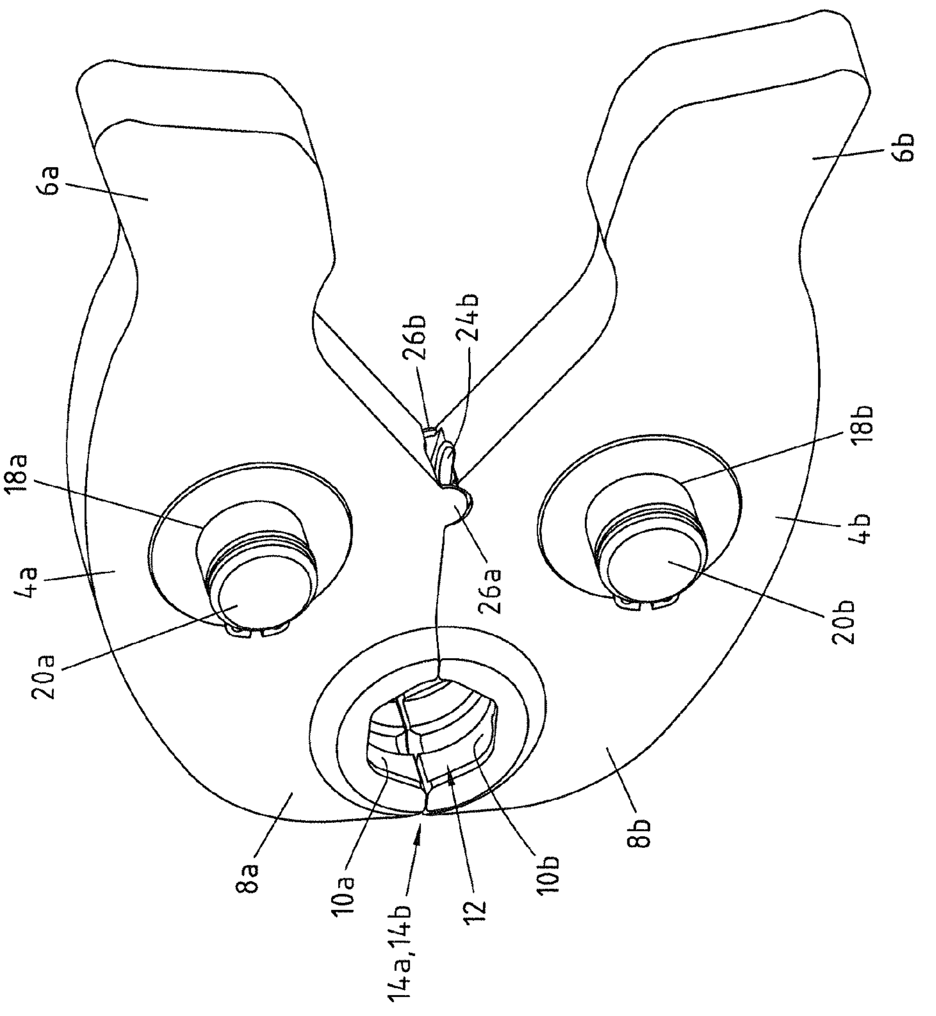
FIG. 4 the press tool shown in FIG. 1 in perspective view without carrier elements and showing the means for synchronization of the pivoting elements.

FIG. 4 shows a perspective view of just the two pivoting elements 4*a*, 4*b* and the associated axes of rotation 20*a*, 20*b*. The pivoting elements 4*a*, 4*b* are joined together by corresponding engagement means 26*a*, 26*b* so that they can rotate. Here the engagement means 26*a*, 26*b* are either side of the recesses 24*a*, 24*b*, of which only recess 24*b* can be seen in the perspective view of FIG. 4. The engagement means 26*a*, 26*b* are designed as a rounded groove and spring connection and work together like a hinge. The compression spring 22 is not present in this representation.

The design of the engagement means 26*a*, 26*b* allows the rotation or pivoting movement of the two pivoting elements 4*a*, 4*b* to be essentially synchronized. Thus neither of the two pivoting elements 4*a*, 4*b* can be rotated or pivoted independently of the respective other pivoting element 4*b*, 4*a*. This advantageously ensures that pivoting of the pivoting elements 4*a*, 4*b* can only take place such that the compression spring cannot be sheared off by a relative horizontal movement in the Figures. In this way, if for example the press tool is hit on an edge at one of the pivoting elements, or if the press tool falls down, an uncontrolled movement relative to one another and thus damage to the compression spring by shearing are avoided.

The invention claimed is:

1. A press tool for connection of a pipe and a fitting, in particular for inseparable connection, comprising: two pivoting elements, two actuating sections formed on the pivoting elements, two opposing pressing sections formed on the pivoting elements, two carrier elements assigned to supporting the pivoting elements, and a bistable tension mechanism, wherein each of the pivoting elements is mounted so that it can pivot about an assigned a corresponding axis of rotation, wherein the carrier elements hold the axes of rotation, wherein each of the opposing pressing sections comprises an inner contour, and the inner contours of the opposing pressing sections of the two pivoting elements form a receiving area, wherein the receiving area formed by the inner contours in a first closed position of the pivoting elements is narrower than in a bistable intermediate position, wherein the receiving area formed by the inner contours in the bistable intermediate position of the pivoting elements is narrower than in a second open position of the pivoting elements, wherein between the two pivoting elements a compression spring is arranged and wherein the compression spring is configured to push the pivoting elements into each of the first closed position and the second open position starting from the bistable intermediate position.

2. The press tool according to claim 1, wherein the bistable intermediate position is set by a linear arrangement of the compression spring along a line spanning between the two axes of rotation.

3. The press tool according to claim 1, wherein the pivoting elements each have a recess to accommodate a corresponding end of the compression spring.

4. The press tool according to claim 1, wherein the pivoting elements are joined together by means of corresponding engagement means so that the pivoting movement of the two pivoting elements is essentially synchronized.

5. The press tool according to claim 2, wherein the pivoting elements each have a recess to accommodate a corresponding end of the compression spring.

6. The press tool according to claim 2, wherein the pivoting elements are joined together by means of corresponding engagement means so that the pivoting movement of the two pivoting elements is essentially synchronized.

7. The press tool according to claim 3, wherein the pivoting elements are joined together by means of corresponding engagement means so that the pivoting movement of the two pivoting elements is essentially synchronized.

8. The press tool according to claim 5, wherein the pivoting elements are joined together by means of corresponding engagement means so that the pivoting movement of the two pivoting elements is essentially synchronized.

* * * * *